May 1, 1923.
Re. 15,593
F. A. POOR
RAIL ANCHOR
Original Filed Jan. 6, 1920
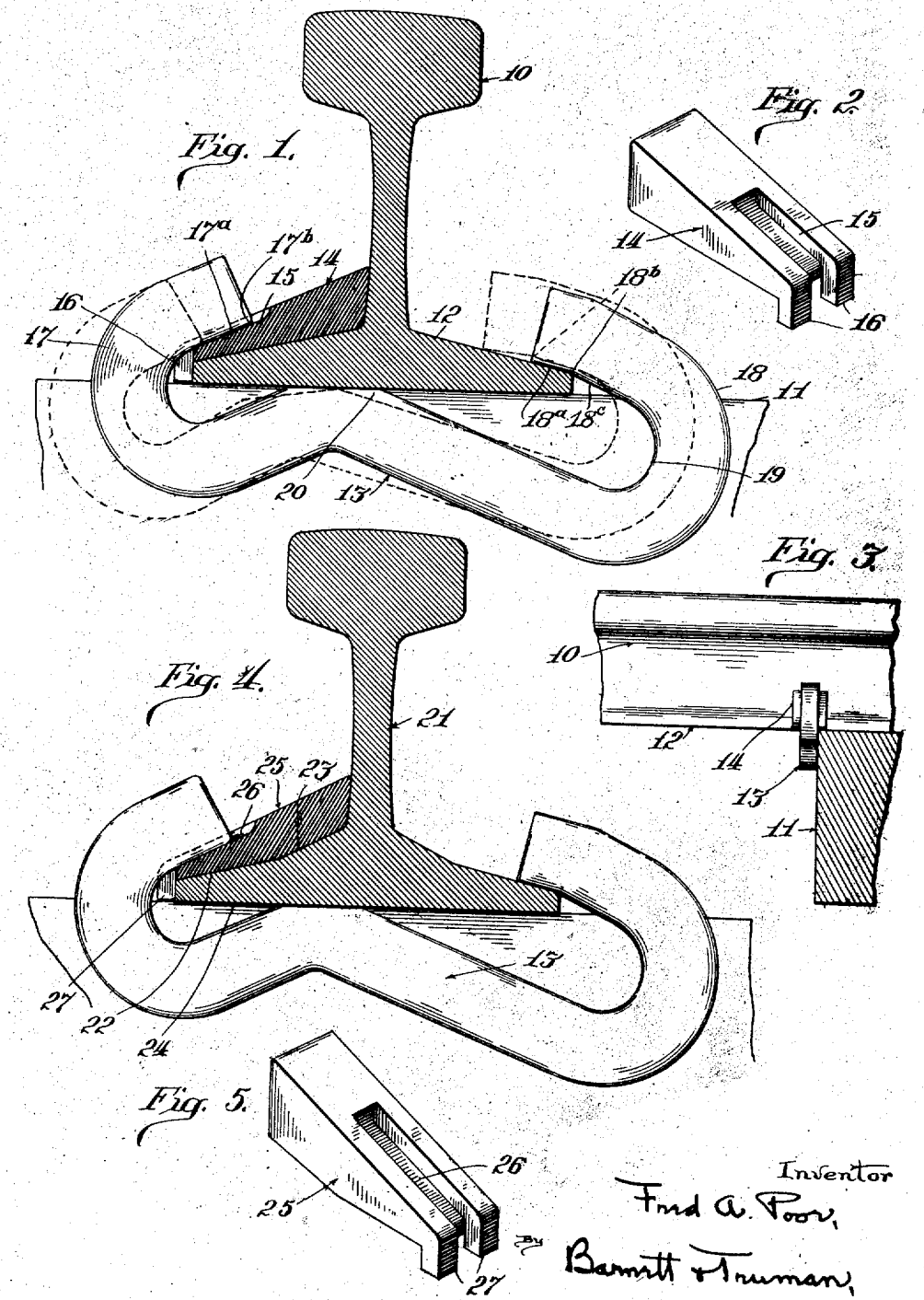
Inventor
Fred A. Poor,
By Barrett & Truman,
Attorneys Reissued May 1, 1923.

Re. 15,593

UNITED STATES PATENT OFFICE.

FRED A. POOR, OF CHICAGO, ILLINOIS, ASSIGNOR TO THE P & M COMPANY, OF CHICAGO, ILLINOIS, A CORPORATION OF ILLINOIS.

RAIL ANCHOR.

Original No. 1,386,800, dated August 9, 1921, Serial No. 349,689, filed January 6, 1920. Application for reissue filed March 14, 1923. Serial No. 625,144.

*To all whom it may concern:*

Be it known that I, FRED A. POOR, a citizen of the United States, residing at Chicago, in the county of Cook and State of Illinois, have invented new and useful Improvements in Rail Anchors, of which the following is a specification.

My invention relates to devices for preventing the longitudinal creep of railway rails, these devices being commonly called rail anchors, anti-creepers, or rail stays.

One of the principal objects of the invention is to provide a rail anchor of simple and compact construction which will maintain a reliable hold on the rail, as against the tendency of the device to become loosened by vibration or other disturbing influences, and which may be very quickly and conveniently put in place on the rail or removed therefrom, if occasion requires.

A further object is to provide a rail anchor which can be used with rails having somewhat different rail base contours, particularly with rails having base flanges which vary in thickness. It is well known that rails of different makes, even when of the same weight per linear unit, differ somewhat in the dimensions and contours of their bases. Rails of the same make sometimes have slight differences due to the wearing of the rolls employed in manufacturing them.

My invention contemplates a rail anchor a part of which is adapted to extend around and be moved transversely on the rail base in application thereto, and a further object of the invention is to provide, in an anchor of this sort, means associated with the rail base whereby the angularity of the surface upon which one portion of such transversely movable part bears is greater than that of that portion of the rail base with which said means is associated whereby said transverse movement results in a tightening of the anchor on the rail and more variation in the rail base contour is permitted without affecting the practical efficiency of the device.

The invention consists in the novel arrangements and constructions to be hereinafter described and claimed for carrying out the above stated objects and such other objects as will appear from the following description.

The invention is illustrated in a certain preferred embodiment in the accompanying drawings, wherein:

Figure 1 is a side elevation of a rail anchor, embodying the principles of my invention.

Figure 2 is a perspective view of a tapered block which is used to provide a surface of increased angularity with respect to the bottom face of the rail for one portion of the transversely movable member to bear upon;

Figure 3 is an end elevation, on a reduced scale, of the device shown as applied to the rail and in position against one of the ties supporting the same;

Figure 4 is a view, similar to Fig. 1, illustrating a modification; and

Figure 5 is a perspective view of the tapered block shown in Fig. 4.

Like characters of reference designate like parts in the several figures of the drawings.

Referring first to Figs. 1 to 3, inclusive, 10 designates a railroad rail and 11 one of the cross ties on which the rail is supported. The rail shown in Fig. 1 is of the standard American type, the top surfaces of the base flanges each being straight and formed at an angle of approximately 13 degrees to the bottom of the base thereof.

The rail anchor comprises a body member adapted to extend under and around the base flanges 12 of the rail, designated generally by the reference character 13 and a tapered block 14 for providing a surface for one portion of the body member to bear upon which surface is of greater angularity with respect to the bottom face of the rail than that of the upper surface of the portion of the rail upon which the block 14 bears. Preferably the block is placed on top of one of the base flanges 12 of the rail and may extend inwardly and abut against the vertical web of the rail, as shown in Fig. 1. The block is preferably provided with means to prevent it from slipping longitudinally on the rail base. The upper surface of the block may be formed so as to provide a groove 15 adapted to receive one jaw of the body member or the block may be provided with two depending lugs 16 which are spaced apart and are adapted to hook over the edge of the base flange. If desired both the groove and the lugs may be used.

The body member 13 is preferably constructed of slightly resilient material and as follows:

The extremities of the body member are bent over to form jaws 17 and 18, respectively, these jaws being formed so that the jaw 18 is approximately twice as long as the jaw 17, and its open portion 19 is somewhat wider than that of the jaw 17. Intermediate its ends, and preferably nearer the jaw 17 than the jaw 18, the body member is bent upwardly so as to form a seat 20 which is adapted to bear against the bottom surface of the rail base. When the body member is thus constructed the proportions and shape of the jaws 17 and 18 relative to the seat 20 when the device is not applied to the rail, are such that if the device be placed so that the surfaces $17^a$ and $18^a$ thereof coincide, respectively, with the top surfaces of the right-hand flange 12 and the block 14, the top surface of the seat 20 will be somewhat above the plane of the bottom of the rail base; in other words, in applying the device to the rail, the seat 20 has to be forced away from the jaws 17 and 18, that is downwardly into a lower plane. The engagements of the anchor with the rail base are such that the body of the anchor is distorted and under a strain when applied to the rail.

The extremity of the jaw 18 is preferably bent so as to provide a shoulder $18^b$. Movement of the body member transversely of the rail, in the direction to place it under a strain, causes the edge of the rail engaged by the jaw 18 to seat behind the shoulder $18^b$ formed on the under surface of the jaw. Further movement of the body member in that direction is resisted by the body member being placed under an increasing strain as the jaw 17 is forced further up the tapered bearing surface of the block 14. Movement in the opposite direction, or backward, is resisted because the angularity of the bearing surface $18^c$, formed on the under surface of the jaw 18, with respect to the bottom face of the rail, is greater than that of the surface $18^a$.

The device is applied to the rail as follows:

The block 14 is placed in position on the base flange as shown in Fig. 1. The jaw 18 is hooked over the right hand flange of the rail base and the body member is then swung upwardly until the seat 20 bears against the bottom of the rail base and the beveled corner $17^b$ of the jaw 17 engages the tapered surface of the block 14, as shown in the dotted lines in Fig. 1. It will be seen that the jaw 17 cannot be moved, from the position shown in dotted lines in Fig. 1, further upon the tapered block 14 without distortion of the body member. The operation of applying the device is completed by driving the jaw 17 upon the block 14 by means of a sledge-hammer or the like, the final position of the body member being substantially as shown in full lines in Fig. 1. The jaw 17 rides in the groove 15 as the body member is moved transversely onto the rail base and the vertical portion of the jaw 17 engages the inner faces of the lugs 16. The tendency of the body member to return to its original shape results in an extremely strong gripping action on the rail base, which is sufficient to hold the device in position on the rail against vibration or other disturbing influences. Backward movement of the body member on the rail base is resisted by the shoulder $18^b$ being in front of and engaged by the edge of the rail base. The device effectively prevents the rail from creeping in the direction from the anchor toward the tie against which the anchor bears, that is to say toward the right in Fig. 3.

The device is of simple and compact construction and may be very quickly applied to or removed from the rail. Another advantage of the device is that it may be used on rails, the bases of which have somewhat different contours. The jaws are of sufficient length to take care of slight differences in width of a given rail base. The tapered block provides a surface for one portion of the body member to bear upon which surface is of greater angularity with respect to the bottom face of the rail than that of the upper face of the flange upon which the block bears which adds to the take-up of the device and permits of more variation in the rail base contour and in the manufacture of the body member. In other words, with the take-up block, there may be considerable variation in the thickness of the rail base and in the relative positions of the jaws 17 and 18 with respect to the seat portion 20, without affecting the efficiency of the device to grip the base of the rail.

In Fig. 4 I have shown the device as applied to a rail 21 which is of the standard British type, the top surfaces 22 and 23 of the base flanges 24 being formed at angles of approximately 6 and 14 degrees, respectively, to the bottom of the base thereof. In Figs. 4 and 5 I have illustrated a modified form of tapered block to provide an engaging or bearing surface of greater angularity than either of those of the base flange of a British type of rail. The bottom of the block 25 is formed to fit the top surfaces of the base flanges of the rail. The block preferably extends inwardly on the flange 24 and abuts against the vertical web of the rail. The block preferably is formed with a groove 26 and lugs 27 which are engaged by the jaw 17 to prevent longitudinal movement of the block on the rail base.

So far as I am aware, I am the first in the art to provide for the use of a take-up block such as that above described, interposed between either one of the jaws of a device of the type shown and the upper face of the adjacent flange, the block being so arranged that, upon a movement of the body and jaws transversely with respect to the rail and with respect to the block, the device is caused to tighten about the rail, either by reason of a differential action at the opposite sides of the rail, or otherwise. While I have shown the jaws 17 and 18 of different length, with reference to the position of the bearing portions of the jaws with respect to the position of the intermediate seat 20, it will be understood that I do not wish to be restricted to this particular arrangement except so far as the claims are specifically so limited. While the wedge 14 is shown in engagement with the flange at the left in Fig. 1, with the thicker portion of the wedge disposed adjacent to the vertical web of the rail, it will be understood that I do not wish to be restricted to this feature except so far as the same is specifically claimed, inasmuch as it is evident that the important characteristic of the operation of the wedge is that the jaw underneath which the wedge is interposed shall be moved upwardly with respect to the upper face of the adjacent flange as the device is moved from its preliminary applied position to the operative tightened position.

I claim:

1. A device for preventing longitudinal creep of railroad rails, comprising a body adapted to extend across the bottom face of a rail, jaws carried by said body and overlying the upper faces of the flanges at opposite sides of the rail, and a take-up block interposed between one of the jaws and the upper face of the adjacent flange serving upon a movement of the body and jaws transversely of the rail with respect to the block to cause the jaw engaging said block to move upwardly with respect to the upper face of the flange for tightening the anchor on the rail.

2. A device for preventing longitudinal creep of railroad rails, comprising a body adapted to extend across the bottom face of a rail, jaws carried by said body and overlying the upper faces of the flanges at opposite sides of the rail, and a take-up block interposed between one of the jaws and the upper face of the adjacent flange serving to cause the jaw engaging said block to move upwardly with respect to the upper face of the flange as said jaw is moved toward the inner edge of the flange in the movement of the body and the jaws transversely of the rail with respect to the block.

3. A device for preventing longitudinal creep of railroad rails, comprising a body adapted to extend across the bottom face of a rail, jaws carried by said body and overlying the upper faces of the flanges at opposite sides of the rail, and a wedge interposed between one of the jaws and the upper face of the adjacent flange serving upon a movement of the jaw transversely of the rail along the upper face of the wedge to cause the anchor to be tightened upon the rail.

4. A device for preventing longitudinal creep of railroad rails, comprising a body adapted to extend across the bottom face of a rail, jaws carried by said body and overlying the upper faces of the flanges at opposite sides of the rail, and a wedge interposed between one of the jaws and the upper face of the adjacent flange with the thicker portion of the wedge disposed adjacent to the central vertical web, said wedge serving upon a movement of the jaw inwardly along the upper face of the wedge to tighten the anchor upon the rail.

5. A device for preventing longitudinal creep of railroad rails, comprising a body adapted to extend across the bottom face of a rail, jaws carried by said body and overlying the upper faces of the flanges at opposite sides of the rail, and a wedge interposed between one of the jaws and the upper face of the adjacent flange serving upon a movement of the body and jaws transversely of the rail with respect to the wedge to cause the jaws at the opposite sides of the rail to have a differential movement vertically with respect to the bearing of the body on the bottom face of the rail whereby the anchor is tightened upon the rail.

6. A device for preventing longitudinal creep of railroad rails, comprising a body adapted to extend across the bottom face of a rail and providing a seat about which the body is adapted to rock transversely of the rail, jaws carried by said body and overlying the upper faces of the flanges at opposite sides of the rail, and a wedge interposed between one of the jaws and the upper face of the adjacent flange serving upon movement of the body laterally of the rail with respect to the wedge to rock the body about the seat serving to tighten the jaws and the seat on the rail.

7. A device for preventing longitudinal creep of railroad rails, comprising a body adapted to extend across the bottom face of a rail, jaws carried by said body and overlying the upper faces of the flanges at opposite sides of the rail, and a wedge interposed between one of the jaws and the upper face of the adjacent flange and held in position on the flange by its engagement with the jaw serving upon a movement of the body and jaws transversely of the rail with respect to the wedge to cause the jaw engaging said block to move upwardly with respect to the upper face of the flange for tightening the anchor on the rail.

8. A device for preventing the longitudinal creep of railroad rails, comprising in combination a member which extends under the rail with its ends projecting over the upper surfaces of the base flanges at opposite sides of the rail, and means associated with one of said base flanges providing a surface for one end of said member to bear upon which surface is of greater angularity with respect to the bottom face of the rail than that of the upper face of the base flange with which it is associated.

9. A device for preventing the lingitudinal creep of railroad rails, comprising in combination a member provided with jaws which project over the upper surfaces of the base flanges at opposite sides of the rail, and means associated with one of said base flanges which provides a bearing surface for one of said jaws, said surface being of greater angularity with respect to the bottom face of the rail than that of the upper face of the base flange with which it is associated.

10. A device for preventing the longitudinal creep of railroad rails, comprising in combination a member provided with jaws which project over the upper surfaces of the base flanges at opposite sides of the rail, and a tapered block associated with one of said base flanges which provides a bearing surface for one of said jaws, said surface being of greater angularity with respect to the bottom face of the rail than that of the upper face of the base flange with which it is associated.

11. A device for preventing the longitudinal creep of railroad rails, comprising in combination a member which extends under the rail and projects over the upper edges of the rail base at opposite sides of the rail and is formed with three engaging surfaces, and means associated with the rail base which provides a bearing surface for one of said engaging surfaces, said bearing surface being of greater angularity with respect to the bottom face of the rail than that of the upper face of the portion of the rail base with which said means is associated.

12. A device for preventing the longitudinal creep of railroad rails, comprising in combination a member which extends under the rail and projects over the upper edges of the rail base at opposite sides of the rail and is formed with three engaging surfaces, two of which engage the upper and lower surfaces, respectively, of the rail base, and a tapered block associated with the rail base which provides a bearing surface for the other of said engaging surfaces said bearing surface being of greater angularity with respect to the bottom face of the rail than that of the upper face of the rail base in association with said block.

13. A device for preventing the longitudinal creep of railroad rails, comprising in combination a member formed with a seat which engages the bottom of the rail base and with jaws which project over the upper surfaces of the base flanges at opposite sides of the rail, and a tapered block associated with one of said flanges which provides a bearing surface for one of said jaws, said surface being of greater angularity with respect to the bottom face of the rail than that of the upper face of the flange with which said block is associated.

14. A device for preventing the longitudinal creep of railroad rails, comprising in combination a member which extends under and around the base flanges of the rail, and means associated with one of said base flanges providing a surface for one end of said member to bear upon which surface is of greater angularity with respect to the bottom face of the rail than that of the upper face of the base flange with which it is associated, said member being adapted to be strained when moved transversely onto the rail base., 15. A device for preventing the longitudinal creep of railroad rails, comprising in combination a member provided with jaws which extend around the base flanges of the rail, and a tapered block associated with one of said base flanges which provides a bearing surface for one of said jaws, said surface being of greater angularity with respect to the bottom face of the rail than that of the upper face of the base flange with which the block is associated, said member being adapted to be strained when moved transversely onto the rail base.

16. A device for preventing the longitudinal creep of railroad rails, comprising in combination a member which extends under and around the rail base and is formed with three engaging surfaces and means associated with the rail base which provides a bearing surface for one of said engaging surfaces, said bearing surface being of greater angularity with respect to the bottom face of the rail than that of the upper face of the rail base in association with said means, said member being adapted to be strained when moved transversely onto the rail base.

17. A device for preventing the longitudinal creep of railroad rails, comprising in combination a member formed with a seat which engages the bottom of the rail base and with jaws which extend around the base flanges, and a tapered block associated with one of said flanges which provides a bearing surface for one of said jaws, said surface being of greater angularity with respect to the bottom face of the rail than that of the upper face of the flange with which said block is associated, said member being adapted to be strained when moved transversely onto the rail base.

18. A device for preventing the longitudinal creep of railroad rails, comprising in combination a member formed with a seat which engages the bottom of the rail base and with jaws which extend around the base flanges said jaws being of unequal length, and means associated with one of the flanges which provides a bearing surface for the shorter jaw, said surface being of greater angularity with respect to the bottom face of the rail than that of the upper face of the flange with which said means is associated.

19. A device for preventing the longitudinal creep of railroad rails, comprising in combination a member formed with a seat which engages the bottom of the rail base and with jaws which extend around the base flanges, said jaws being of unequal length, and a tapered block associated with one of said flanges which provides a bearing surface for the shorter jaw, said surface being of greater angularity with respect to the bottom face of the rail than that of the upper face of the flange with which said block is associated, said member being adapted to be strained when moved transversely onto the rail base.

20. A rail anchor comprising in combination a body member having an intermediate portion engageable with the bottom of the rail base and terminal jaws formed thereon and adapted to extend around the flanges of the base, and a tapered block associated with one of the flanges under one of said jaws providing a bearing surface therefor which is of greater angularity with respect to the bottom face of the rail than that of the upper face of the base flange with which the block is associated, whereby the jaws may be tightened or loosened when the body member is moved transversely on the rail base.

21. A device for preventing the longitudinal creep of railroad rails comprising in combination a member having a jaw formed on one end and adapted to hook over the edge of one of the base flanges of the rail, a portion adapted to engage the bottom of the rail base and a jaw formed on the other end adapted to extend over the upper surface of the opposite base flange when that end of the member is swung upwardly, and a tapered block associated with one of said flanges providing a bearing surface for one of said jaws which is of greater angularity with respect to the bottom face of the rail than that of the upper face of the base flange with which the block is associated.

22. A device for preventing the longitudinal creep of railroad rails comprising in combination a member having a long jaw formed on one end and adapted to hook over the edge of one of the base flanges of the rail, a portion adapted to engage the bottom of the rail base, and a short jaw formed on the other end and adapted to extend around the opposite base flange when that end of the member is swung upwardly, and a tapered block associated with one of the flanges providing a bearing surface for the shorter jaw which surface is of greater angularity with respect to the bottom face of the rail than that of the upper face of the base flange with which the block is associated.

23. A device for preventing the longitudinal creep of railroad rails, comprising in combination a member formed from a single bar of metal bent to form a seat to engage the bottom of the rail base and terminal jaws adapted to project over the upper surfaces of the base flanges of the rail at opposite sides thereof and a tapered block associated with one of said flanges providing a bearing surface for one of the jaws which surface is of greater angularity with respect to the bottom face of the rail than that of the upper face of the base flange with which it is associated.

24. A device for preventing the longitudinal creep of railroad rails comprising in combination a member formed from a single bar of metal bent to form a seat adapted to engage the bottom of the rail base and terminal jaws of unequal length adapted to extend around the base flanges of the rail, and a tapered block associated with one of said flanges providing a bearing surface for the shorter jaw which surface is of greater angularity with respect to the bottom face of the rail than that of the upper face of the base flange with which it is associated, said member being adapted to be strained when moved transversely onto the rail base.

25. A device for preventing the longitudinal creep of railroad rails, comprising in combination a member formed with a seat which engages the bottom of the rail base and with jaws which extend around the base flanges, and a tapered block associated with one of said flanges which provides a bearing surface for one of said jaws, said surface being of greater angularity with respect to the bottom face of the rail than that of the upper face of the flange with which said block is associated, said seat being so disposed with relation to said jaws as to necessitate distortion of said member when the same is moved transversely onto the rail base.

26. A device for preventing the longitudinal creep of railroad rails comprising in combination a member having the ends thereof bent to form jaws adapted to extend around the flanges of the rail base, one of said jaws being extended outwardly to provide an interior clearance to permit the preliminary positioning of the member on said rail base, and a tapered block associated with one of said flanges providing a bearing surface for the short jaw which surface is of greater angularity with respect to the bottom face of the rail than that of the upper face of the flange with which it is associated, said member being formed intermediate its jaws, and at the side of its center remote from said extended jaw, with a seat for engaging the bottom of the rail base, said jaws and seat being disposed so as to necessitate distortion of the member when it is forced transversely onto the rail base.

27. A device for preventing the longitudinal creep of railroad rails comprising in combination a member which extends under the rail base and is provided with jaws extending around the base flanges of the rail, and a tapered block adapted to rest on one of said base flanges thereby providing a bearing surface for one of said jaws which bearing surface is of greater angularity with respect to the bottom face of the rail than that of the upper face of the base flange on which the block rests said block having means to prevent relative movement thereof with respect to the base flange.

28. A device for preventing the longitudinal creep of railroad rails comprising in combination a member which extends under the rail base and is provided with jaws extending around the base flanges of the rail, and a tapered block adapted to rest on one of said base flanges thereby providing a bearing surface for one of said jaws which bearing surface is of greater angularity with respect to the bottom face of the rail than that of the upper face of the base flange on which the block rests, said block having a depending lug adapted to hook over the edge of the base flange to prevent relative movement thereof with respect to the base flange.

29. A device for preventing the longitudinal creep of railroad rails comprising in combination a member which extends under the rail base and is provided with jaws extending around the base flanges of the rail, and a tapered block adapted to rest on one of said base flanges thereby providing a bearing surface for one of said jaws which bearing surface is of greater angularity with respect to the bottom face of the rail than that of the upper face of the base flange on which the block rests, said block having two depending lugs between which the arm of the adjacent jaw is adapted to rest thereby preventing relative movement of the block with respect to the base flange.

30. A device for preventing the longitudinal creep of railroad rails comprising in combination a member which extends under the rail base and is provided with jaws extending around the base flanges of the rail, and a tapered block adapted to rest on one of said base flanges thereby providing a bearing surface for one of said jaws which bearing surface is of greater angularity with respect to the bottom face of the rail than that of the upper face of the base flange on which the block rests, said block extending inwardly and abutting against the vertical web of the rail.

31. A device for preventing the longitudinal creep of railroad rails comprising in combination a member which extends under the rail base and is provided with jaws extending around the base flanges of the rail, and a tapered block adapted to rest on one of said base flanges thereby providing a bearing surface for one of said jaws which bearing surface is of greater angularity with respect to the bottom face of the rail than that of the upper face of the base flange on which the block rests, said block having a groove in its top surface in which the associated jaw rides when said member is moved transversely on the rail base.

32. A device for preventing the longitudinal creep of railroad rails comprising in combination a member which extends under the rail base and is provided with jaws extending around the base flanges of the rail, and a tapered block adapted to rest on one of said base flanges thereby providing a bearing surface for one of said jaws which bearing surface is of greater angularity with respect to the bottom face of the rail than that of the upper face of the base flange on which the block rests, said block extending inwardly and abutting against the vertical web of the rail and having a groove in its top surface in which the associated jaw rides when said member is moved transversely on the rail base.

33. A device for preventing the longitudinal creep of railroad rails, comprising in combination a member which extends under and around the base flanges of the rail, means associated with one of said base flanges providing a surface for one end of said member to bear upon which surface is of greater angularity with respect to the bottom face of the rail than that of the upper face of the base flange with which it is associated, said member being adapted to be strained when moved transversely onto the rail base, and means adapted to prevent said member from moving transversely of the rail base in the opposite direction.

34. A device for preventing the longitudinal creep of railroad rails, comprising in combination a member which extends under and around the base flanges of the rail, means associated with one of said base flanges providing a surface for one end of said member to bear upon which surface is of greater angularity with respect to the bottom face of the rail than that of the upper face of the base flange with which it is associated, said member being adapted to be strained when moved transversely onto the rail base, and means carried by said member and adapted to engage the edge of the rail base whereby transverse movement of the member on the rail base in the opposite direction is resisted.

35. A device for preventing the longitudinal creep of railroad rails, comprising in combination a member provided with jaws which extend around the base flanges of the rail, and means associated with one of said base flanges which provides a bearing surface for one of said jaws, said surface being of greater angularity with respect to the bottom face of the rail than that of the upper face of the base flange with which said means is associated, said member being adapted to be strained when moved transversely onto the rail base, the other jaw having a shoulder which seats in front of the edge of the rail base when the device is applied to the rail whereby transverse movement of the member on the rail base in the opposite direction is resisted.

36. A device for preventing the longitudinal creep of railroad rails, comprising in combination a member formed with a seat which engages the bottom of the rail base and with jaws which extend around the base flanges, said jaws being of unequal length, and means associated with one of the flanges which provides a bearing surface for the shorter jaw, said surface being of greater angularity with respect to the bottom face of the rail than that of the upper face of the flange with which said means is associated, said longer jaw having a shoulder which seats in front of the edge of the rail base when the device is applied to the rail whereby transverse movement of the member on the rail base in the opposite direction is resisted.

37. A device for preventing the longitudinal creep of railroad rails, comprising in combination a member provided with jaws which extend around the base flanges of the rail, and means associated with one of said base flanges which provides a bearing surface for one of said jaws, said surface being of greater angularity with respect to the bottom face of the rail than that of the upper face of the base flange with which said means is associated, said member being adapted to be strained when moved transversely onto the rail base, the other jaw being bent to provide a surface which bears on the rail flange when the device is applied to the rail, the angularity of the surface bearing on the flange with respect to the bottom face of the rail being less than that of the lower surface of the jaw in front of the bend.

38. A device for preventing the longitudinal creep of railroad rails, comprising in combination a member formed with a seat which engages the bottom of the rail base and with jaws which extend around the base flanges, said jaws being of unequal length, and means associated with one of the flanges which provides a bearing surface for the shorter jaw, said surface being of greater angularity with respect to the bottom face of the rail than that of the upper face of the flange with which said means is associated, said longer jaw being bent to provide a surface which bears on the rail flange when the device is applied to the rail, the angularity of the surface bearing on the flange with respect to the bottom face of the rail being less than that of the lower surface of the jaw in front of the bend.

39. A device for preventing the longitudinal creep of railroad rails, comprising in combination a member provided with jaws which extend around the base flanges of the rail, and a tapered block associated with one of said base flanges which provides a bearing surface for one of said jaws, said surface being of greater angularity with respect to the bottom face of the rail than that of the upper face of the base flange with which the block is associated, said member being adapted to be strained when moved transversely onto the rail base, the other jaw being bent to provide a surface which bears on the base flange when the device is applied to the rail, the angularity of the surface bearing on the flange with respect to the bottom face of the rail being less than that of the lower surface of the jaw in front of the bend.

40. A device for preventing the longitudinal creep of railroad rails, comprising in combination a member formed with a seat which engages the bottom of the rail base and with jaws which extend around the base flanges, said jaws being of unequal length, and a tapered block associated with one of said flanges which provides a bearing surface for the shorter jaw, said surface being of greater angularity with respect to the bottom face of the rail than that of the upper face of the flange with which said block is associated, said member being adapted to be strained when moved transversely onto the rail base, said longer jaw being bent to provide a surface which bears on the rail flange when the device is applied to the rail, the angularity of the surface bearing on the flange with respect to the bottom face of the rail being less than that of the lower surface of the jaw in front of the bend.

FRED A. POOR.